United States Patent
Arora et al.

(10) Patent No.: US 9,128,591 B1
(45) Date of Patent: Sep. 8, 2015

(54) PROVIDING AN IDENTIFIER FOR PRESENTING CONTENT AT A SELECTED POSITION

(71) Applicant: Audible, Inc., Newark, NJ (US)

(72) Inventors: Ajay Arora, New York, NY (US); Douglas S. Goldstein, Riverdale, NY (US)

(73) Assignee: Audible, Inc., Newark, NJ (US)

( * ) Notice: Subject to any disclaimer, the term of this patent is extended or adjusted under 35 U.S.C. 154(b) by 221 days.

(21) Appl. No.: 13/663,358

(22) Filed: Oct. 29, 2012

(51) Int. Cl.
*G06F 3/0483* (2013.01)
*G06F 17/30* (2006.01)

(52) U.S. Cl.
CPC ........ *G06F 3/0483* (2013.01); *G06F 17/30876* (2013.01); *G06F 17/30887* (2013.01)

(58) Field of Classification Search
None
See application file for complete search history.

(56) References Cited

U.S. PATENT DOCUMENTS

| | | | |
|---|---|---|---|
| 8,042,036 B1* | 10/2011 | Sharma et al. | 715/208 |
| 8,612,845 B2* | 12/2013 | Nelson et al. | 715/205 |
| 8,725,565 B1* | 5/2014 | Ryan | 705/14.4 |
| 2002/0082939 A1* | 6/2002 | Clark et al. | 705/26 |
| 2005/0022113 A1* | 1/2005 | Hanlon | 715/511 |
| 2012/0173659 A1* | 7/2012 | Thaxter et al. | 709/217 |
| 2012/0197998 A1 | 8/2012 | Kessel et al. | |

OTHER PUBLICATIONS www.epubread.com/en/, NPL_EPUBReader_Home, Oct. 5, 2010.*
www.epubread.com/en/ebooks.php, NPL_EPUBReader_Ebooks, Oct. 7, 2011.*
'PDF Open Parameters', Adobe Systems Incorporated, version: Acrobat 6.0, May 2003, in 8 pages.
U.S. Appl. No. 13/433,183 titled 'Electronically Creating and Managing Book Discussion Groups', filed Mar. 28, 2012.
U.S. Appl. No. 13/433,190, titled 'Electronically Providing Book Discussion Group Information', filed Mar. 28, 2012.

* cited by examiner

Primary Examiner — Boris Pesin
Assistant Examiner — Nhat-Huy T Nguyen
(74) Attorney, Agent, or Firm — Knobbe, Martens, Olson & Bear, LLP

(57) ABSTRACT

Systems and methods are provided for generating an identifier that identifies a specific position within content. For example, at least a portion of content may be presented in a manner such that any position within the presented content can be selected, such as a specific word or line of text content. A selection may be received indicating a position within the content, where the selection corresponds to a request to generate an identifier that identifies the selected position. In response, an identifier may be generated that includes information identifying the content and the position within the content, such that selection of the identifier causes presentation of a representation of the content at the given position.

25 Claims, 6 Drawing Sheets

PROVIDING AN IDENTIFIER FOR PRESENTING CONTENT AT A SELECTED POSITION

BACKGROUND

Generally described, computing devices and communication networks facilitate the collection and exchange of information. In a common application, computing devices, such as personal computing devices, can utilize a wide area communication network, such as the Internet, to access content or other data from other computing devices associated with content providing entities. Users can request data from a content providing entity such that the content is delivered to one or more computing devices in a relatively "real time" basis. For example, users can request content from a network resource for immediate rendering on a computing device display screen or they can request the immediate transfer of content for storage. In another example, users can transmit a request, or initiate a transaction, that results in the downloading or streaming of content to a computing device. Typically, the content providing entity would initiate the transfer upon receipt of the request from the computing device.

Various computing devices associated with a user or a user account may have access to different representations of content provided by content providing entities. For example, a user may be associated with a wireless computing device corresponding to an electronic book reader ("e-book reader") that has obtained a digital representation of content (e.g., a digital publication that can be presented on an e-book reader) via a communication network (e.g., a wireless communication network). The same user and/or another user may be associated with a personal computing device that has obtained a separate representation of the same content (e.g., a copy of the digital publication that can be presented on a display associated with the e-book reader) via the same or a different communication network. Still further, one or more users may be associated with a digital audio player that has obtained a separate representation of the same content (e.g., an audio book that can be audibly presented via headphones or speakers) from the same or a different communication network.

Depending on the capabilities and functionality associated with each respective device and the specific nature of the content, a user accesses content via a presentation interface associated with a specific device (e.g., a display on a wireless e-book reader device). In some devices, the user can provide, or associate, additional information with the content, such as annotations, bookmarks, excerpts, etc., during the presentation of the content on a specific device. If the user wishes to direct a second user to content, such as a book that the first user believes may be of potential interest to the second user, the first user would typically send a general reference to the book or to a certain representation of the book to the second user in order for the second user to determine whether to purchase or otherwise obtain the content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
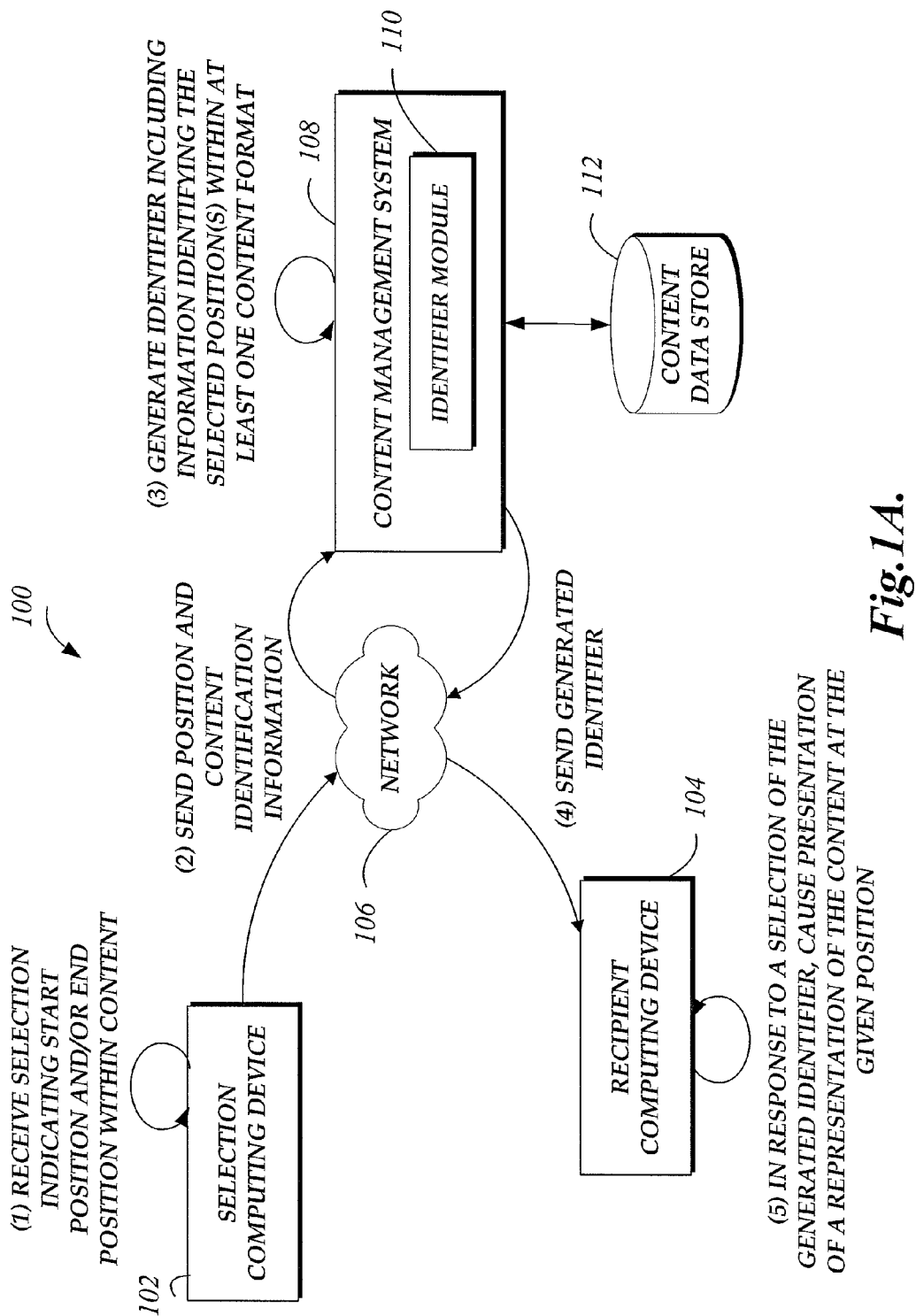
FIG. 1A is a block diagram depicting an illustrative operating environment in which a content management system generates an identifier that includes information identifying a position within content, where the position is received from a selection computing device and the generated identifier is sent to a recipient computing device.

Generally described, aspects of the present disclosure relate to providing an identifier, such as a uniform resource identifier ("URI"), which references a specific position within content. For example, aspects of the present disclosure may enable a user reading content, such as an electronic book, to request that an identifier be generated that, when selected, provides a direct link to a specific position within the content. A user may desire such an identifier, for example, in order to send the identifier to a friend in order for the friend to view the content at the given position. As another example, the user may desire such an identifier in order to include the identifier in an email, article or other content authored by the user. In some embodiments, the position to be identified in the generated identifier may be selected by the user as any word, line, paragraph, image location, table location or other element within the content. In some embodiments, the identifier may include information identifying a portion of the content defined by a start position and an end position within the content.

In some embodiments, at least a portion of content may be presented in a manner such that a position within the presented content can be selected. The content may be presented such that any position within the portion can be selected regardless of whether any previously stored identification information is associated with the position. For example, a position may be selected that does not correspond to any predefined tag or marker stored in association with the content. An identifier module as disclosed herein may receive a user selection indicating a position within the content, where the selection corresponds to a request to generate an identifier that identifies the position. The identifier module may then generate an identifier that includes information identifying both the content and the position within the content. Subsequent selection of the identifier on a computing device may cause presentation of a representation of the content at a position corresponding to the position identified in the generated identifier. Accordingly, the identifier may enable a recipient of the identifier to select the identifier in order to view, listen to, or otherwise be presented with at least a portion of the content at or near the position identified in the generated identifier.

Content can refer to any data that can be directly or indirectly accessed by a user, including, but not limited to, multimedia data, digital images, digital video, text, audio data, electronic documents, publications, electronic books, computer-executable code, portions of the above, and the like. In some embodiments, the same or similar content may be represented in more than one format. For example, a given underlying book may be associated with one representation in an audio book format, another representation in an electronic book format that includes text information, and a third representation in an electronic book format that includes scanned image information representing words on a page. In some embodiments in which different representations of content are sufficiently similar in at least portions of the content, synchronization information may be stored that associates corresponding positions within the two or more representations.

In some embodiments, a first content and a second content that can be synchronized may be considered companion content. For each pair of companion content, content synchronization information associated with the companion content can be generated, transmitted, and/or obtained via computing devices in a communication network. The content synchronization information can include any data related to the synchronous presentation of the first content and the second content, so as to enable one or more computing devices to synchronously present the companion content. Content synchronization information can include reference points mapping positions or portions of the first content to corresponding positions or portions of the second content. In a specific example, content synchronization information can include data that can be used to map a segment of text (e.g., a word, line, sentence, paragraph, etc.) to a timestamp of a corresponding audio recording.

A given position within content may be identified, for example, by an offset (e.g., a byte offset indicating the number of bytes from the start of the content or the start of a subsection of the content, or some other memory offset), a word offset (e.g., the number of words from the start of the content or the start of a subsection), a timestamp, and/or other information. The synchronous presentation of the companion content can vary as a function of the capabilities and/or configuration of the device (e.g., a portable e-book reader vs. a mobile phone) and/or the formats of the content in a companion content pair (e.g., a digital publication and an audio recording vs. a video and an audio recoding). Accordingly, the content synchronization information can be generated in a variety of formats, versions, etc. Moreover, the content synchronization information can include match information and/or passage mismatch information, which can be used for synchronously presenting content that contains some mismatching information. According to some embodiments, content synchronization information can generally include any combination of features or data used to synchronize content described in U.S. patent application Ser. No. 12/273,473 ("the '473 Application"), filed Nov. 18, 2008, entitled "SYNCHRONIZATION OF DIGITAL CONTENT," which is hereby incorporated herein by reference in its entirety.

FIG. 1A is a block diagram depicting an illustrative operating environment 100 in which a content management system 108 may generate an identifier that includes information identifying a position within content, such as a specific position within a given content file. As illustrated, the content management system 108 may receive the position from a selection computing device 102, and may send the generated identifier to a recipient computing device 104, as described in more detail below. As illustrated, the content management system 108 may include an identifier module 110 that may be used to implement various aspects of the present disclosure, such as generating an identifier that identifies a position within content, and/or presenting content in response to selection of an identifier. Those skilled in the art will recognize that the selection computing device 102, recipient computing device 104 and content management system 108 may each be any of a number of computing devices that are capable of communicating over a network including, but not limited to, a laptop, personal computer, personal digital assistant (PDA), hybrid PDA/mobile phone, mobile phone, electronic book reader, digital media player, and the like.

The content management system 108, which will be described below in more detail, may be connected to or in communication with a content data store 112. The data stored in content data store 112 may include, for example, a number of representations of content, such as audio books, electronic books, and/or other content files in various formats. Additionally, the content data store 112 may include synchronization information that maps positions or portions of a first representation of content to corresponding positions or portions of a second representation of the content, as described in the '473 Application referenced above. In some embodiments, the content management system 108 may be connected to or in communication with one or more additional data stores (not illustrated) that store user data for a number of users of the content management system and/or of a retail system. User data may include, for example, purchase history, information identifying content accessible to the user, book reviews and ratings, personal information, user preferences, location information, device information, etc. The content data store 112 and/or any additional data stores may each be local to content management system 108, may be remote from the content management system 108, and/or may be a network-based service itself.

In the environment shown in FIG. 1A, the selection computing device 102 and recipient computing device 104 are in communication with the content management system 108 via a communication network 106, such as the Internet or other communications link. The network 106 may be any wired network, wireless network or combination thereof. In addition, the network 106 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The selection computing device 102 may present content to a user. For example, the selection computing device 102 may present for display a user interface that includes a page of content from an electronic book that the user is currently reading. As another example, the selection computing device 102 may aurally present audio content corresponding to an audio book. A user interface presented by the selection computing device may include one or more selectable options that enable the user to select a position or portion of the presented content for which the user would like an identifier generated. For example, there may be a specific passage or portion of the content to which the user would like to direct a friend, a book club member, or other individual. As illustrated in FIG. 1A, the selection computing device 102 may receive a user selection indicating a start position and/or an end position within the content. The selection may be associated with a request by the user for an identifier to be generated that includes the position information corresponding to the user's selection. Depending on the embodiment, the request to generate the identifier may be received via a selectable option within a user interface presented by the selection computing device 102, a gesture captured using an optical input device in communication with the selection computing device, a voice command or other spoken word recognized by the selection computing device, and/or one or more other input methods.

In the embodiment illustrated in FIG. 1A, once the selection computing device 102 receives the selection indicating a selected start position and/or end position within the content, the selection computing device 102 sends position information to the content management system 108, along with information identifying the content (such as a number or code used to identify the content in the content management system 108, a title of the content, and/or other information from which the identifier module 110 can identify the content). The information provided to the content management system 108 may additionally include information identifying a format of the representation of the content to which the position information applies. In some embodiments, the position information sent to the content management system may be different than the position information received in the user selection. As one example, the position information sent to the content management system may be in the form of an offset representing the number of bytes or words from the beginning of the content to the selected position. The selection computing device 102 may determine this offset information based on the received selection information, such as by determining the word or byte offset corresponding to a word, line, paragraph, or other selected position within a displayed portion of the content.

As illustrated in FIG. 1A, the identifier module 110 of the content management system 108 generates an identifier based at least in part on the information received from the selection computing device 102. The generated identifier may be, for example, a text string, a URI or other data that can be interpreted by a browser, electronic book reader or other program operating on a computing device in order to present the identified content, request the identified content from a server or other system, or the like. The generated identifier may include information identifying the content and information identifying the selection position(s) (e.g., starting position and/or ending position) within at least one format of the content. The identifier may also include information identifying the content format and/or representation to which each position refers. In some embodiments, a single generated identifier may include information identifying a number of different positions, such as a starting position and/or ending position for each of a number of portions of the content selected by the user of the selection computing device 102.

A generated identifier may, in some embodiments, include metadata of various types. For example, the metadata could include information regarding the time, location, temperature and/or environment where the user was consuming the content when he requested that the identifier module 110 generate the identifier. Other examples of metadata that may be included in a generated identifier include a reference to additional information about a topic, time period, person, place, character, event or other referent referenced in the content, and/or any other supplemental content related to the content. The metadata included in the identifier may be included automatically by the identifier module 110, may be included based on preferences set by the user, and/or may be included based on a selection made by the user when requesting that the identifier module 110 generate the identifier. In some embodiments, the identifier may additionally include a note or comment from the user to be presented with the content when the identifier is later selected by a recipient.

In some embodiments, when generating an identifier, the identifier module 110 may retrieve synchronization information from the content data store 112 that synchronizes a representation of the content from which the user selected the position and companion content, such as one or more representations of the content in other formats. In some embodiments, the identifier module may include in the generated identifier corresponding position information for a number of different representations of the content. For example, the identifier module 110 may include in the generated identifier offset information identifying the selected position in a first electronic book version of the content, offset information identifying the corresponding position in a second electronic book version of the content, and timestamp information identifying the corresponding position in an audio book format of the content. In other embodiments, the identifier module 110 may include position information relative to only a single content format, such as a default or reference content format from which corresponding positions in companion content may be determined at the time a recipient selects or accesses the generated identifier.

The identifier module 110 may determine the content format(s) for which to include position information, in some embodiments, based on user information associated with an intended recipient of the generated identifier. For example, the identifier module 110 may retrieve information indicating device information associated with the recipient and/or information identifying content and content formats that the recipient has purchased or otherwise been granted access to when determining which content format(s) to reference in the identifier. In some embodiments, the position information and/or content identification information included in the generated identifier may be encrypted by the identifier module 110 prior to providing the identifier to the recipient.

Once the identifier module 110 has generated the identifier in the illustrated embodiment, the content management system 108 sends the generated identifier to one or more computing devices, such as recipient computing device 104. The recipient computing device 104 may be, for example, a computing device associated with a recipient that was selected or identified by the user of the selection computing device 102 in association with the user's request to generate the identifier. For example, the recipient could be a friend of the user, a family member, book club member, social network connection, or the like. The generated identifier may be provided, for example, in an email message, in a message provided on a page associated with an account of the recipient, or by a notification provided within a content presentation program, electronic book reader or other program executed by the recipient computing device. If the recipient selects the identifier, the recipient computing device 104 and/or content management system 108 may cause presentation of at least one representation of the content at a position corresponding to the position previously selected by the user of selection computing device 102 when requesting that the identifier be generated and provided to the recipient.

Depending on the environment in which the identifier is selected and/or the content format, the content may be presented via a browser, an electronic book reader, a media player and/or other program. The specific representation of the content and the location from which the content is retrieved may vary depending on the embodiment. For example, if the recipient computing device has access to a local or remote data store that includes a given representation of the content (such as a representation of the content that the recipient previously purchased, obtained and/or was granted access to), that representation may be retrieved and presented to the recipient beginning at the identified position. In other embodiments, selection of the identifier may result in a request to the content management system 108 for one or more representations of the content. In response, the content management system 108 may provide access to a full representation of the content, or may provide access to a limited preview version of the content that may include at least part of a portion identified in the identifier. The extent of access provided to the content and/or the format of the content selected for presentation may depend, in some embodiments, at least in part on user information associated with the recipient, such as content purchase history, content browsing history, device information, etc.

Figure 1B:
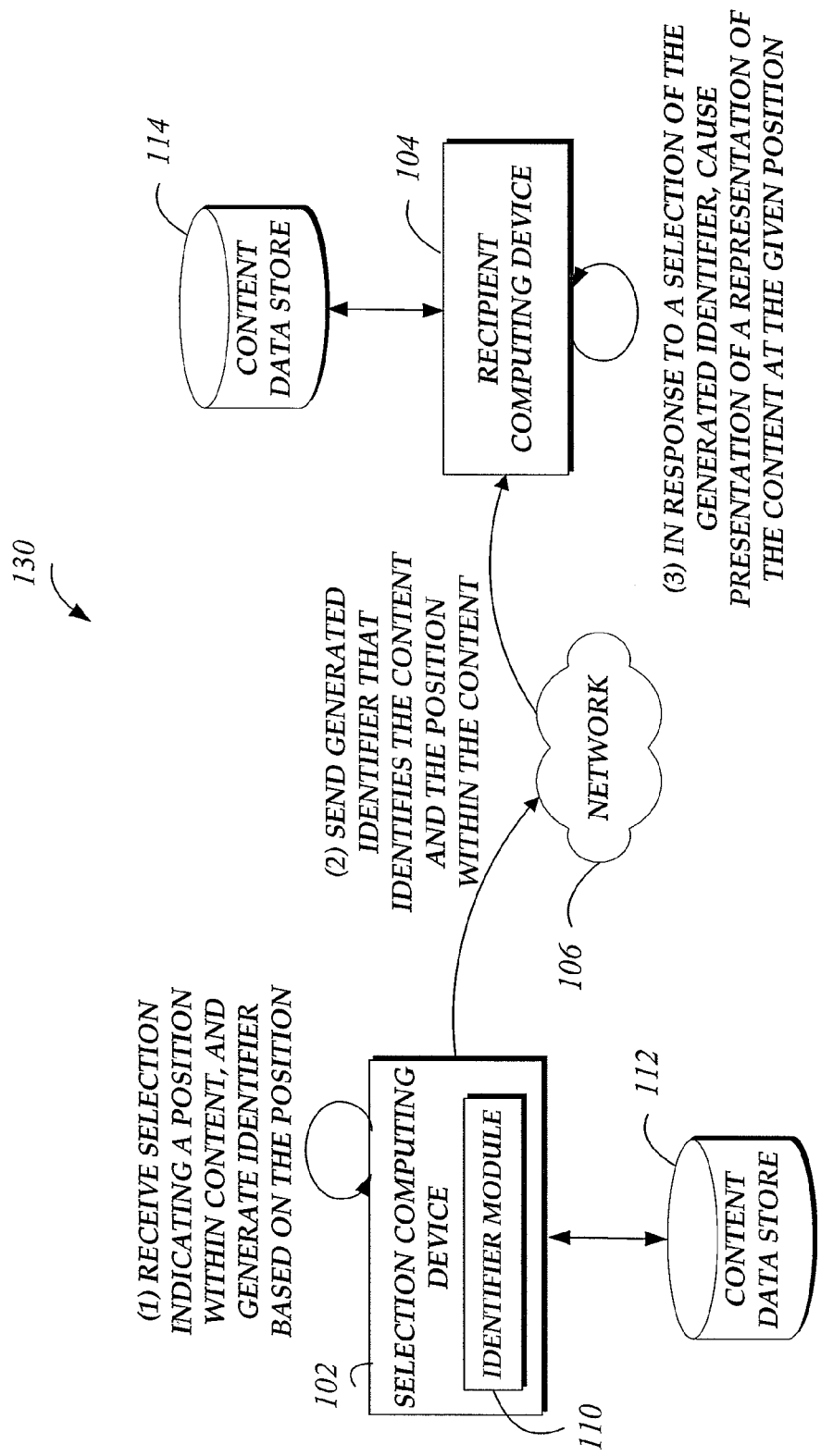
FIG. 1B is a block diagram depicting an illustrative operating environment in which a selection computing device generates an identifier that includes information identifying a position within content and provides the generated identifier to a recipient computing device, such that a user of the recipient computing device may select the identifier in order to be presented with the content at the given position.

FIG. 1B is a block diagram depicting an illustrative operating environment 130 in which the selection computing device 110 generates an identifier that includes information identifying a position within content and provides the generated identifier to the recipient computing device 104. As illustrated, operating environment 130 differs from operating environment 100 in part by not including a content management system. As illustrated, the selection computing device includes an identifier module 110 and is in communication with a content data store 112, which may include content synchronization information. In the illustrative operating environment 130, in response to receiving a user selection indicating a position within content, the identifier module 110 of the selection computing device 102 generates an identifier that identifies the position within the content. The identifier may be generated by the selection computing device in a manner similar to the methods described above with reference to generation of an identifier by the content management system 108, and may include information similar to that described above.

The selection computing device 102 may send the generated identifier to the recipient computing device 104. The recipient computing device 104 may, in response to a selection of the generated identifier by a user of recipient computing device 104, cause presentation of at least one representation of the content at a position corresponding to the position included in the identifier. For example, the recipient computing device 104 may retrieve a previously stored representation of the content from content data store 114 and present the content beginning at or near the position identified in the identifier. In some embodiments, the recipient computing device may access content synchronization information in content data store 114 in order to determine a corresponding position in companion content that is not specifically identified in the received identifier.

Illustrative operating environments 100 and 130 are depicted in FIGS. 1A and 1B as distributed computer environments comprising several computer systems that are interconnected using one or more computer networks. In other embodiments, the operating environment could include a greater or fewer number of components than are illustrated in FIG. 1A or FIG. 1B. Thus, the depictions in FIGS. 1A and 1B should be taken as illustrative and not limiting to the present disclosure. For example, a system could implement various Web services components and peer-to-peer network configurations to implement at least a portion of the processes disclosed herein.

Figure 2:
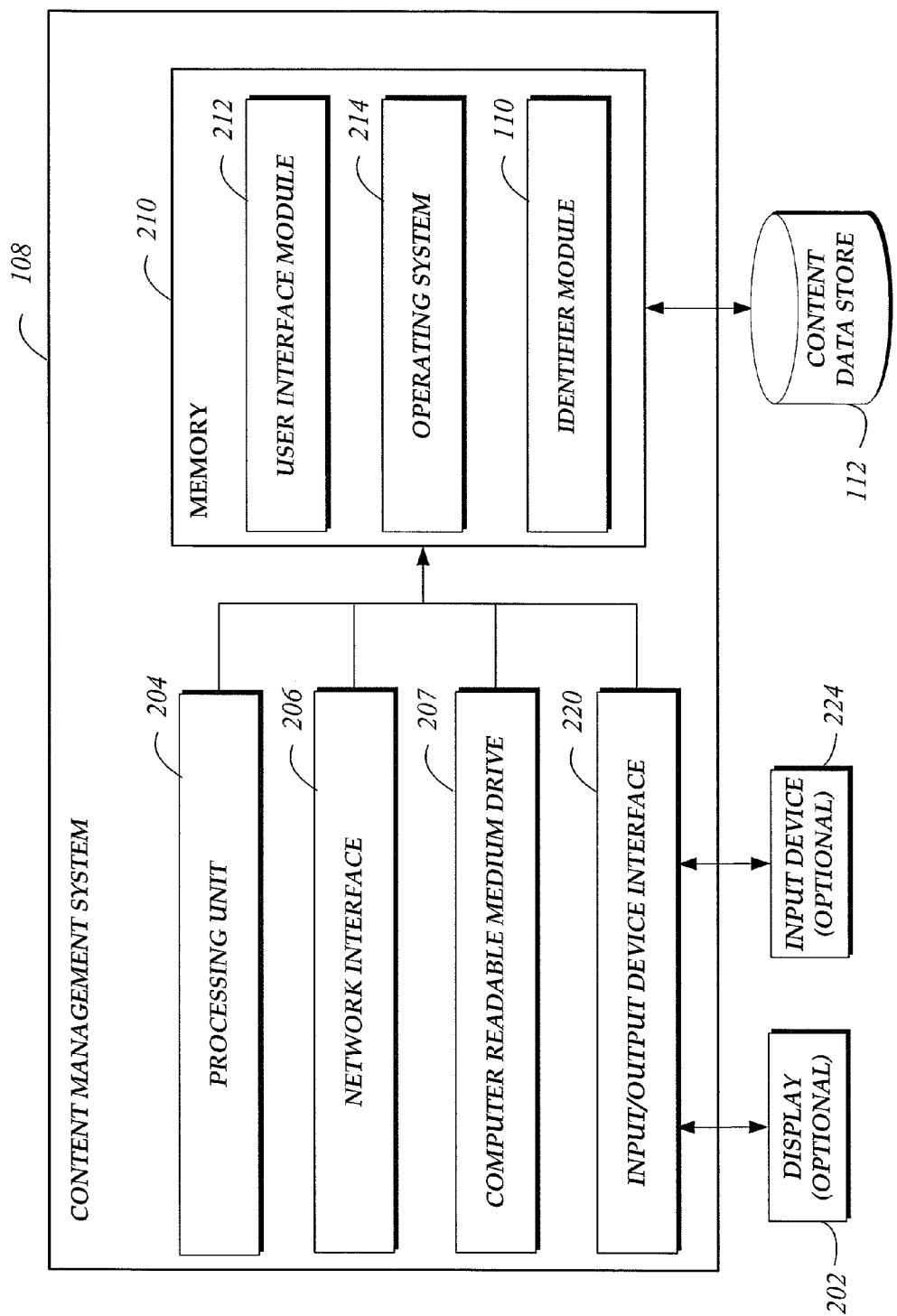
FIG. 2 depicts a general architecture of a content management system for generating identifiers and presenting information in response to selection of an identifier.

FIG. 2 depicts an example of a general architecture of a content management system 108 for generating identifiers and/or presenting content in response to a request for information associated with a previously generated identifier. The general architecture of the content management system 108 depicted in FIG. 2 includes an arrangement of computer hardware and software components that may be used to implement aspects of the present disclosure. The content management system 108 may include many more (or fewer) components than those shown in FIG. 2. It is not necessary, however, that all of these generally conventional components be shown in order to provide an enabling disclosure. As illustrated, the content management system 108 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, touch screen, microphone, motion sensor, etc.

The memory 210 contains computer program instructions that the processing unit 204 executes in order to implement one or more embodiments. The memory 210 generally includes RAM, ROM and/or other persistent or non-transitory computer-readable media. The memory 210 may store an operating system 214 that provides computer program instructions for use by the processing unit 204 in the general administration and operation of the content management system 108. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with a content data store 112, discussed above with reference to FIGS. 1A and 1B.

In addition to the user interface module 212, the memory 210 may include an identifier module 110 that may be executed by the processing unit 204. In one embodiment, the identifier module 110 implements various aspects of the present disclosure, such as generating an identifier that includes information identifying a position within content, as described further below. While the identifier module 110 is shown in FIG. 2 as part of the content management system 108, in other embodiments, all or a portion of an identifier module may be a part of the selection computing device 102 and/or recipient computing device 104. For example, in certain embodiments of the present disclosure, the selection computing device 102 and/or recipient computing device 104 may include several components that operate similarly to the components illustrated as part of the content management system 108, including a user interface module, identifier module, processing unit, computer readable medium drive, etc. In such embodiments, the selection computing device 102 and/or recipient computing device 104 may communicate with a content data store, such as content data store 112, and the content management system 108 may not be needed in certain embodiments.

Figure 3:
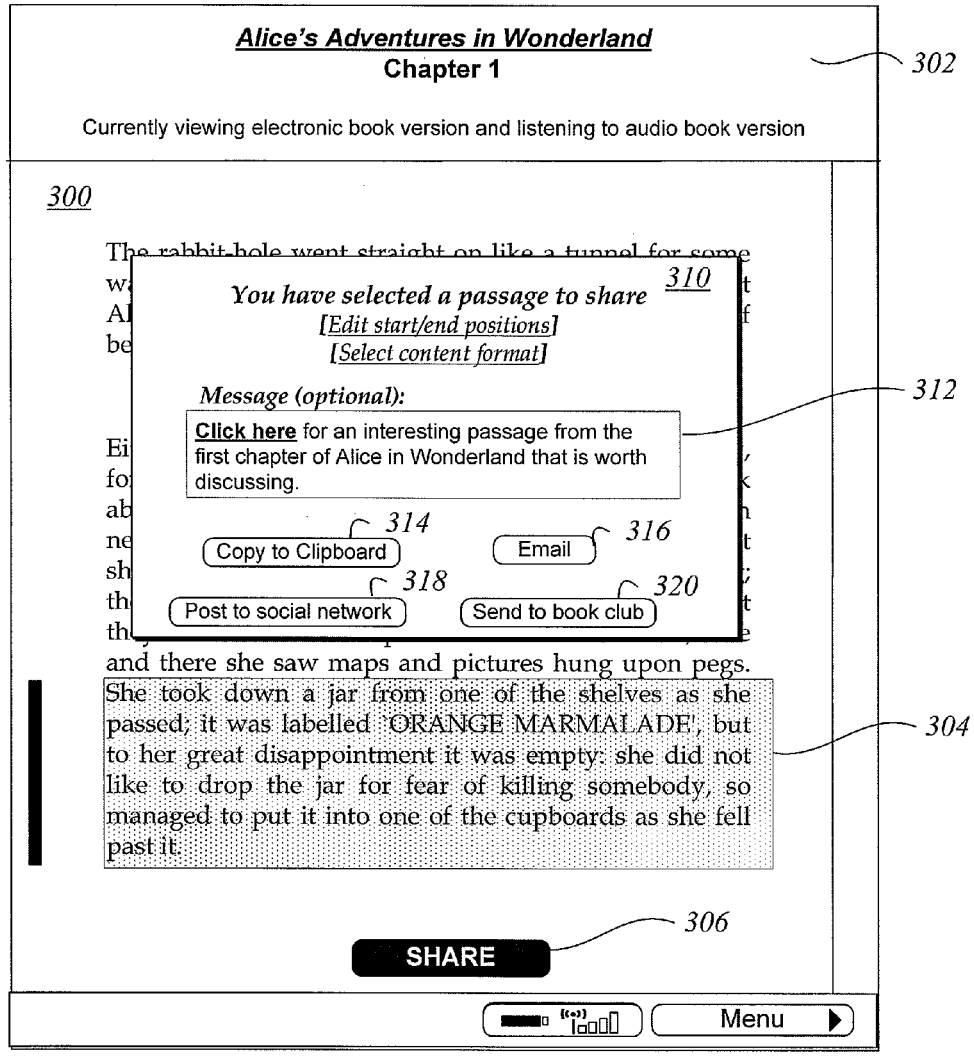
FIG. 3 is an illustrative user interface generated for display by a selection computing device that provides a user with selectable options for generating an identifier that identifies a selected position within content.

FIG. 3 includes an illustrative user interface generated for display by the selection computing device 102 that provides a user with selectable options for generating an identifier that identifies a selected position within content. As indicated by text 302, the selection computing device 102 may be visually presenting text content 300 from an electronic book version of *Alice's Adventures in Wonderland*, while aurally presenting synchronized companion audio content. User prompt 310 may be presented for display by the selection computing device 102 based on the user highlighting or otherwise selecting the highlighted content portion 304 and selecting the share option 306. Prompt 310 includes an option for the user to edit the start and/or end positions of the highlighted content portion 304 selected by the user. Prompt 310 additionally includes an option to select a content format to include in the identifier. For example, the user may specify, in some embodiments, which formats or representations of the content (such as an electronic book and/or an audio book) the generated identifier should reference. The prompt 310 additionally includes a message field 312 in which the user has entered text to accompany the generated identifier when the identifier is provided to one or more recipients. The "Click here" portion of the message 312 may be a selectable reference that represents the generated identifier (with the identifier itself hidden from the user in the illustrated example). Depending on the embodiment, the selection computing device 102 may generate the identifier itself, or may receive the generated identifier in response to a request to the content management system 108 to generate the identifier.

The prompt 310 includes an option 314 which the user may select in order for the selection computing device 102 to electronically copy the generated identifier and/or the message 312, such that the user may electronically paste the identifier elsewhere, such as in a separately composed message or document. The user may select option 316 in order to send the identifier and/or message 312 by email to one or more recipients selected by the user. Option 318 may instead be selected if the user desires to post the identifier and/or message 312 to a social network profile or post associated with the user. Selection of book club option 320 may result in display of a list of members of one or more book clubs or groups to which the user belongs, such that the user may select one or more of the members to receive the identifier and/or message 312.

Figure 4:
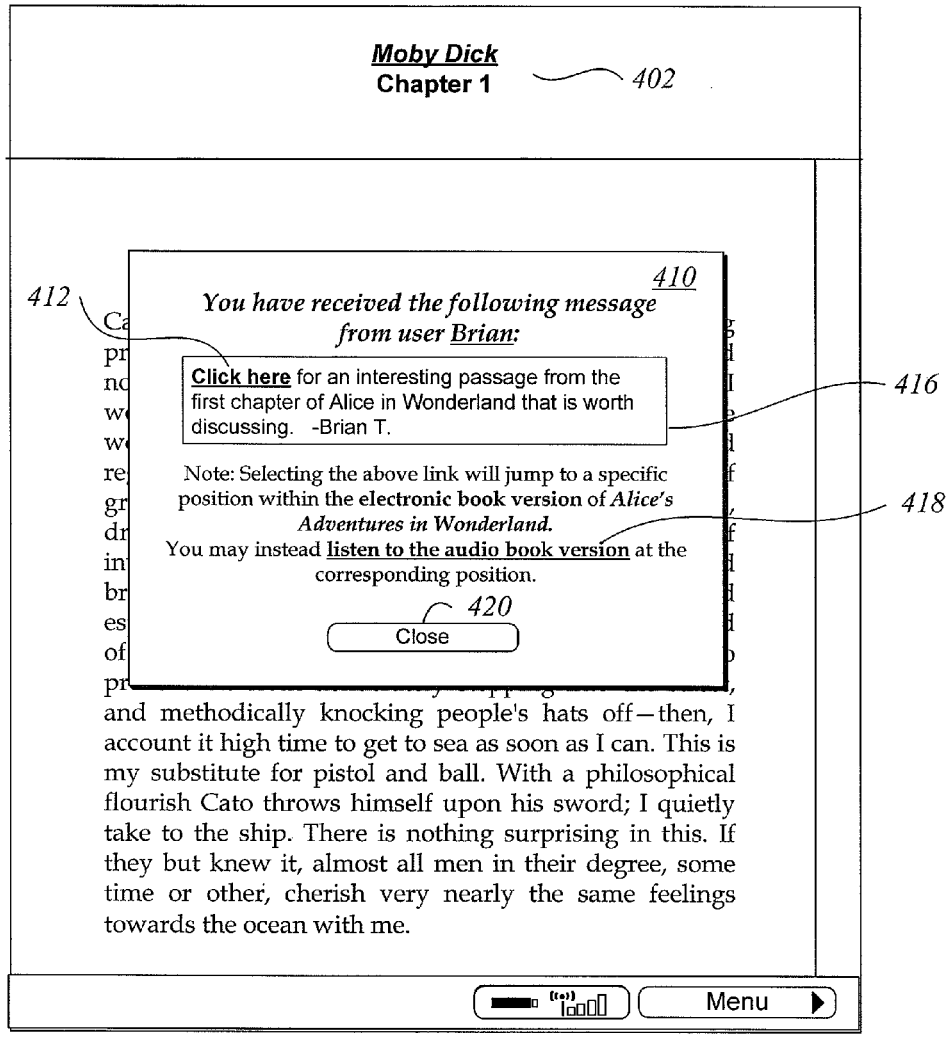
FIG. 4 is an illustrative user interface generated for display by the recipient computing device that provides a user with a selectable identifier, such that selection of the identifier causes content to be presented at a specific position identified by the identifier.

FIG. 4 includes an illustrative user interface generated for display by the recipient computing device 104 that provides a recipient user with a selectable identifier, such that selection of the identifier causes content to be presented at a specified position. As illustrated in text 402, the user may have been reading a representation of the book *Moby Dick* when prompt 410 presented the user with a message 416 received from "Brian," who may be the user of selection computing device 102. As illustrated, message 416 is the same as message 312 described above with reference to FIG. 3. The message 416 invites the user to select the identifier 412 (which may be represented by the text "click here" in order to mask an underlying URI or text string) in order to be presented with a passage from *Alice's Adventures in Wonderland* selected by the user Brian. As indicated, selection of the identifier 412 in this example will cause the recipient computing device 104 to present the user with content at the identified position in an electronic book version of *Alice's Adventures in Wonderland*, as discussed with reference to FIG. 5 below. Alternatively, the user may select option 418 to listen to the corresponding portion of an audio book version of *Alice's Adventures in Wonderland*.

As discussed above, the selected content may be retrieved from a content data store local to the recipient computing device 104 or remote from the recipient computing device 104. The recipient computing device 104 may determine the position or portion of the content to present based at least in part on position information provided in the identifier 412, such as a start position and/or end position. As discussed above, the identifier may reference position information relative to a different representation or format of the content than that retrieved by the recipient computing device 104. In such a case, the recipient computing device may determine the corresponding position in the retrieved representation of the content based at least in part on content synchronization information. In some embodiments, if the recipient has not been previously provided with a representation of the content or with access to the content, selection of the identifier 412 may result in a request to the content management system 108. The content managements system 108 may, for example, provide the user with a preview of the content at the given position and/or an option to purchase the content. If the user does not wish to access the content identifier by identifier 412, the user may select the close option 420.

Figure 5:
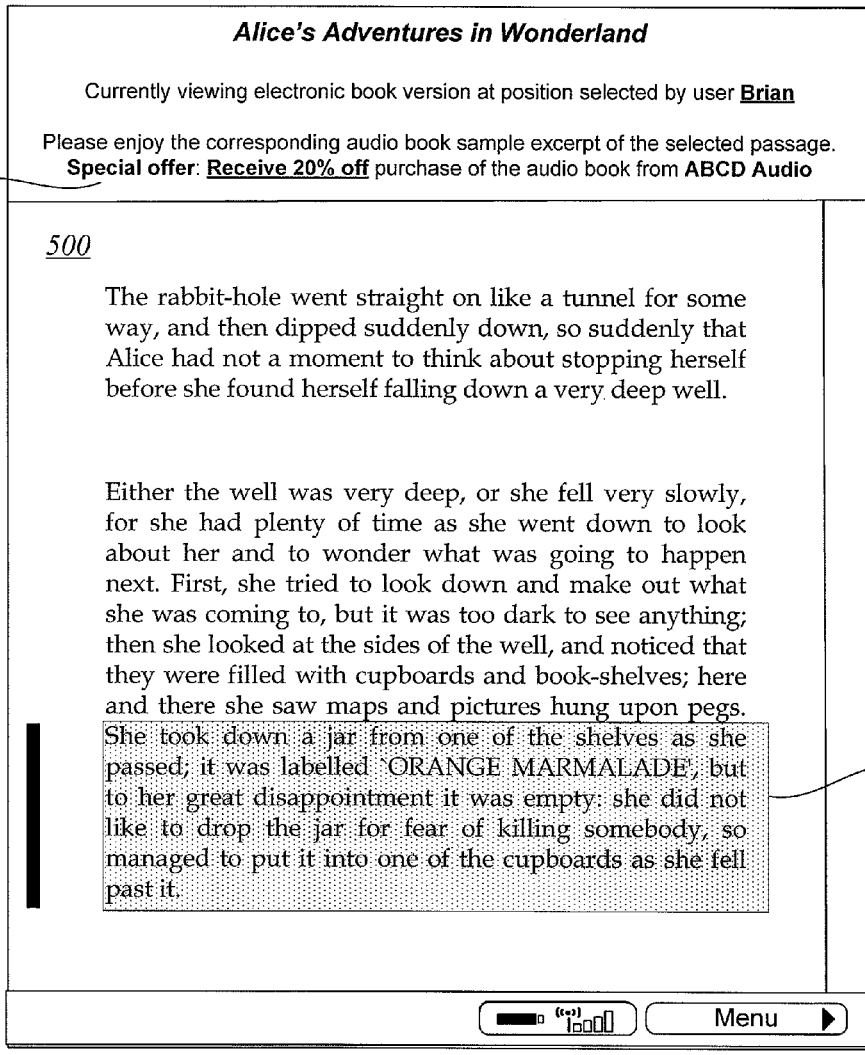
FIG. 5 is an illustrative user interface generated for display by the recipient computing device in response to a user selection of an identifier that identifies a specific position within content.

FIG. 5 includes an illustrative user interface generated for display by the recipient computing device 104 in response to a user selection of an identifier that identifies a specific position within content. The illustrative user interface may be presented, for example, in response to user selection of identifier 412 discussed above with reference to FIG. 4. As illustrated, a content portion 500 is presented that corresponds to the content portion 300 displayed during the request to generate the identifier in the user interface of FIG. 3. The recipient computing device 104 has visually distinguished the highlighted content portion 506 based on a start position and end position included in the selected identifier. For example, the identifier may have identified the word "She" (such as by a word offset or byte offset representing the number of words or bytes, respectively, between the beginning of the book content and the given word or byte) as the starting position and the word "it" as the ending position defining the portion to visually distinguish. Depending on the embodiment, when the content is presented in response to selection of the identifier, a passage or content portion identified by one or more positions in the identifier may be highlighted, underlined, and/or presented in different font (e.g., using different color, size, type, effect, etc.). In other embodiments, selection of an identifier may cause presentation of the portion of content at an identified position without highlighting or otherwise distinguishing any portion. In embodiments in which the identifier includes an embedded note or comment, the note or comment may be presented alongside the content 506, such as in a margin, or otherwise presented in association with the presentation of the identified content 506 (not illustrated). In some cases, the user may be able to navigate to any other portion of the content beyond the portion 500 initially presented. In other cases, according to certain embodiments, the user may only access limited portions of the content unless the user has purchased, rented or otherwise been granted access to the full content.

As illustrated, text 504 includes an offer to receive a discount on the purchase of a corresponding audio book version of the content *Alice's Adventures in Wonderland*, which the user may have previously purchased in electronic book format. The offer may have been determined and generated, for example, by the content management system 108 based on user information associated with the user of recipient computing device 104, such as information indicating that the user had not previously purchased the audio book version of the content. In some embodiments, the content management system 108 may provide the user with a free sample of the audio book content at the identified position, which may be aurally presented in synchronization with the displayed content 300.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    a data store that stores a first version of digital content, the first version of the digital content including text;
    one or more computer systems in communication with the data store that are configured to at least:
        cause display of at least a portion of the first version of the digital content;
        receive a selection of a word or line of text within the displayed portion;
        determine a first position within the stored first version of the digital content at which the word or line appears;
        determine a second position within a second version of the digital content at which the word or line appears, wherein the second position at which the word or line appears in the second version of the digital content is different than the first position at which the word or line appears in the first version of the digital content;
        generate an identifier that includes information identifying each of: the first version of the digital content, the first position within the first version of the digital content, the second version of the digital content, and the second position within the second version of the digital content; and
        send the identifier to a computing device with access to at least one of the first version of the digital content or the second version of the digital content, such that the information included in the identifier enables the computing device to present at least one of (a) the first version of the digital content at the first position, or (b) the second version of the digital content at the second position.

2. A system comprising:
    a data store that stores at least a first representation of content;
    one or more computer systems in communication with the data store that are configured to at least:
        cause presentation of a portion of the first representation of the content such that a position within the portion can be selected, wherein the portion is presented such that any position within the portion can be selected regardless of whether any previously stored identification information is associated with the position;
        receive a selection of one or more words within the portion of the content, wherein the selection corresponds to a request to generate information that identifies a position of the one or more words in the first representation of the content;
        determine the position of the one or more words in the first representation of the content;
        determine a second position at which the one or more words are included in a second representation of the content, wherein the second position at which the one or more words are included in the second representation of the content is different than the position of the one or more words in the first representation of the content; and
        generate an identifier that includes information identifying each of: the first representation of the content, the position within the first representation of the content, the second representation of the content, and the second position; wherein the identifier enables a computing device that has access to one of the first representation of the content or the second representation of the content to cause presentation of one of (a) the first representation of the content at the position, or (b) the second representation of the content at the second position.

3. The system of claim 2, wherein the position is defined based on at least one of a byte offset, a word number, a line number, a paragraph number, a location of an image, or a location of a table.

4. The system of claim 2, wherein causing presentation of the first representation of the content at the position comprises beginning presentation at the position while enabling access to a first full representation of the content; and wherein causing presentation of the second representation of the content at the second position comprises beginning presentation at the second position while enabling access to a second full representation of the content.

5. The system of claim 2, wherein causing presentation of the first representation of the content at the position comprises beginning presentation at the position and enabling access to a first partial representation of the content; and
wherein causing presentation of the second representation of the content at the second position comprises beginning presentation at the second position and enabling access to a second partial representation of the content.

6. The system of claim 5, wherein the first partial representation comprises a preview of the content that includes at least a portion of content subsequent to the one or more words.

7. The system of claim 2, further comprising, in response to a selection of the identifier, presenting an offer to purchase access to a representation of the content in at least one format.

8. The system of claim 2, wherein selection of the identifier causes presentation of a representation of the content with a portion of the content visually distinguished.

9. The system of claim 2, wherein the identifier comprises a text string.

10. The system of claim 2, wherein the identifier comprises a uniform resource identifier.

11. The system of claim 2, wherein the information identifying the second representation of the content and the second position is encrypted in the identifier.

12. The system of claim 2, wherein the selection corresponding to the request to generate the identifier is received as at least one of a gesture, a touch or a spoken word.

13. The system of claim 2, wherein the one or more words comprise a line of text.

14. A computer-implemented method comprising:
as implemented by one or more computing devices configured with specific executable instructions,
receiving indication of a selection of an identifier, wherein the identifier includes information identifying (a) a first representation of content and a first position within the first representation of the content, and (b) a second representation of the content and a second position within the second representation of the content, wherein the first position is different than the second position;
in response to the selection, determining that the one or more computing devices have access to a representation of the content identified in the identifier, wherein the representation is one of the first representation or the second representation; and
presenting at least a portion of the representation of the content, wherein presenting the at least a portion of the representation of the content comprises presenting one of: content at the first position within the first representation identified in the identifier, or content at the second position within the second representation identified in the identifier.

15. The computer-implemented method of claim 14, wherein the first position is an offset that identifies a number of bytes from a start of the first representation of the content or from a reference point within the first representation of the content.

16. The computer-implemented method of claim 14, wherein the first position identifies a number of words from a start of the first representation of the content or from a reference point within the first representation of the content.

17. The computer-implemented method of claim 14, wherein the representation of the content comprises at least one of text content, image content or audio content.

18. The computer-implemented method of claim 14, wherein the representation of the content to which the one or more computing devices have access is determined based at least in part on information associated with a user that selected the identifier.

19. The computer-implemented method of claim 18, wherein the representation of the content to which the one or more computing devices have access is determined based at least in part on information identifying a format of one or more representations of the content that have been previously provided to the user.

20. The computer-implemented method of claim 14, wherein the identifier further includes information identifying a format of the first representation of the content.

21. The computer-implemented method of claim 14, wherein a format of the first representation of the content is different than a format of the second representation of the content.

22. The computer-implemented method of claim 14, further comprising presenting for display a comment included in the identifier, wherein the comment is presented in association with the presentation of the at least a portion of the representation of the content.

23. A computer-readable, non-transitory storage medium storing computer executable instructions that, when executed by one or more computing devices, configure the one or more computing devices to perform operations comprising:
causing display of a portion of content;
receiving a selection of one or more words within the displayed portion of content, wherein the selection corresponds to a request to generate information that identifies a position of the one or more words, wherein the position is not identified by any predefined identifier stored within the content;
determining a first position at which the one or more words are included in a first representation of the content;
determining a second position at which the one or more words are included in a second representation of the content, wherein the second position at which the one or more words are included in the second representation of the content is different than the first position at which the one or more words are included in the first representation of the content; and
generating an identifier that includes information identifying: (a) the first representation of the content and the first position, and (b) the second representation of the content and the second position.

24. The computer-readable, non-transitory storage medium of claim 23, wherein the identifier is a uniform resource identifier.

25. The computer-readable, non-transitory storage medium of claim 23, wherein selection of the identifier causes presentation of at least one of (a) the first representation of the content at the first position, or (b) the second representation of the content at the second position.

* * * * *